May 6, 1924. 1,493,329

J. M. EVERTS

STOCK WATERING DEVICE

Filed July 13, 1923

INVENTOR.
J. M. Everts,
BY
Geo. T. Kimmel
ATTORNEY.

Patented May 6, 1924.

1,493,329

UNITED STATES PATENT OFFICE.

JOHN M. EVERTS, OF BAILEYVILLE, KANSAS.

STOCK-WATERING DEVICE.

Application filed July 13, 1923. Serial No. 651,336.

*To all whom it may concern:*

Be it known that I, JOHN M. EVERTS, a citizen of the United States, residing at Baileyville, in the county of Nemaha and State of Kansas, have invented certain new and useful Improvements in Stock-Watering Devices, of which the following is a specification.

This invention relates to stock watering devices, and has for one of its objects to simplify and improve the construction and increase the efficiency and utility of devices of this character.

Another object of the invention is to provide a device of this character having means whereby a limited quantity of water only can be supplied to the watering trough at each drinking, thereby preventing waste of the water.

Another object of the invention is to provide a device of this character having means whereby the animals are prevented from fouling the drinking trough, and with means whereby the trough may be readily cleansed and thereby maintained in sanitary condition.

Figure 1:
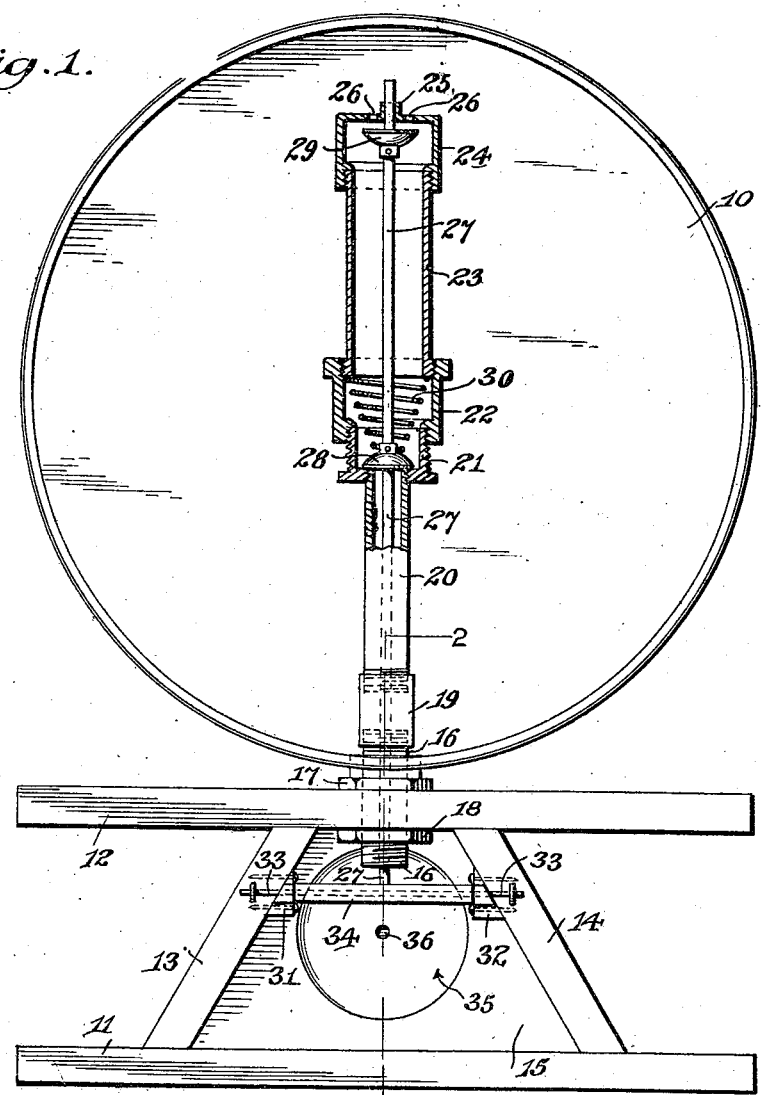

With these and other objects in view, the invention consists in certain novel features of construction as hereinafter shown and described and then specifically pointed out in the claims, and in the drawings illustrative of the preferred embodiment of the invention, Figure 1 is a plan view, partly in section, of the improved device.

Figure 2:
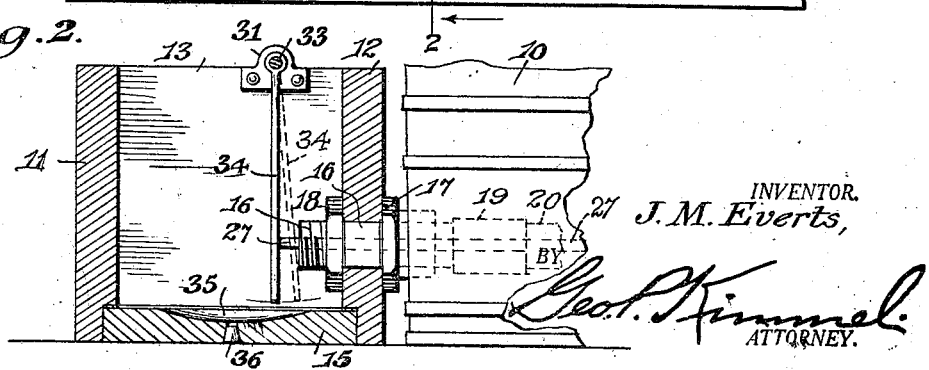

Fig. 2 is a section on the line 2—2 of Fig. 1.

The improved device includes a tank 10 of any suitable size or material and a watering trough preferably formed of relatively long front and rear members 11 and 12, obliquely directed intermediate transverse members 13 and 14, and bottom member 15.

The chamber which is thus formed for the water is narrowed toward the rear, and confines the water to a relatively small area, so that the animals will not be liable to foul the drinking water, while the relatively long front and rear members 11 and 12 insure the stability of the trough.

Extending through one wall of the tank 10 and the rear wall 12 of the trough within the water chamber, is a nipple member 16, being coupled in position by any suitable means, for instance by clamp nuts 17—18, as shown. Coupled to the inner end of the nipple 16, by a coupling 19 is a tubular conductor 20, and coupled to the inner end of the conductor 20 is a chamber formed of two sections 21 and 22, and coupled to the outer end of the chamber section 22 is a tubular container 23. The portions 16—19 and 20 form a conduit between the chamber 21 and 22 and the trough.

Coupled to the outer end of the container 23 is a relatively large cap member 24 having a guide hub 25 and a plurality of perforations 26 in its outer end.

Movable through the conduit 20, the chamber, the receptacle and the cap is a rod or stem 27, and attached to the stem and movable therewith are valves 28 and 29, the valves being adapted to be alternately seated against the inner face of the cap 24, and the inner end of the conduit section 20.

By this arrangement, the valve 28 will shut off the flow from the receptacle 23 to the conduit while the valve 29 will be spaced from the perforated outer end of the cap 24 and permit water to flow into the receptacle 23, when the rod is in one position, and then when the rod is in its other position, the valve 29 will shut off the flow to the receptacle and the valve 28 will open the flow from the receptacle to the conduit.

A spring 30 is located in the chamber formed by the members 21 and 22, and operates to yieldably hold the valve 28 normally in closed position, and one end of the stem 27 projecting into the trough area.

Attached to the upper portions of the end members 13 and 14 of the trough are bearings 31 and 32, and supported in these bearings is a suspension rod 33, and depending from the rod is a gate-like member 34 resting by its lower part against the spring pressed rod 27.

The bottom 15 of the trough is preferably formed with a dish-shaped cavity represented at 35 and into which the water will settle to facilitate the consumption of the water by the animals.

A draw off plug 36 is disposed at the lowest point of depression 35 to facilitate the cleansing of the trough.

By this arrangement, the contents of the receptacle 23 and the conduit 16—19—20 only will be supplied to the trough when the nose of the animal bears against the gate 34 in his efforts to gain access to the water in the trough, or to increase the desired quantity.

Initially the gate 34 will be manually actuated to open the valve 28 against the resistance of the spring 30 and close the valve 29 and permit the contents of the receiver 23 to flow into the trough. On the release of the gate 34 the valve 28 will be closed and the valve 29 opened by the reaction of the spring 30, and the receptacle refilled.

As the animals consume the water in the trough, they naturally press their noses against the gate 34 and release the contents of the receptacle 23, which flows into the trough, but this movement of the gate shuts off the inflow into the receptacle, so that only the contents of the latter will be supplied at any one time to the trough. By this means the waste is avoided, and the presence of stagnant or fouled water in the trough is avoided.

The device is simple in construction, can be made of any suitable material and of any size of capacity.

The preferred embodiment of the invention is disclosed in the drawings and set forth in the specification, but it will be understood that modifications within the scope of the claims may be made in the construction without departing from the principle of the invention or sacrificing any of its advantages.

It is to be understood, that if desirable, the members 16, 19 and 20 may be disposed at an inclination to insure drainage of the water therefrom, eliminating the liability of the water freezing therein in cold weather.

Having thus described the invention, what is claimed as new is:—

1. In a stock watering device, a tank, a container therein having apertures communicating therewith, a conduit from said container and extending exteriorly of said tank, a trough fed by said conduit, a reciprocable element having one end mounted in said container body and its other end projecting into said trough, a pair of valve heads housed in said container and mounted upon said elements, a spring member engaging one of said heads and normally causing the same to close said conduit, said spring further causing said other head to be moved from its seat to uncover said apertures, and a transversely extending gate pivotally swung from the side walls of said trough and engaging the projected end of said element and adapted to be swung rearwardly by an animal to shift said element and heads, to open said conduit and close said apertures, for delivering to said trough the contents of the container.

2. In a stock watering device, a tank, a drinking trough, a conduit connecting said tank and trough, a container within said tank comprising a cylindrical central portion, a cap threaded upon one end of said cylindrical portion having its end portion formed to provide a bearing and further having apertures therethrough about said bearing, telescoping means coupled to the other end of said central portion to provide a chamber, said means further being coupled to said conduit, a shiftable element having one end supported in said bearing and extending through said container and conduit into said trough, valve heads carried upon said element within said container, one normally seated to close said conduit and the other normally unseated to uncover said apertures, a spring in said chamber contacting with said conduit closing valve head to seat the same, and animal controlled means in said trough for shifting said element and valve head to allow the contents of said container to discharge into said trough.

In testimony whereof, I affix my signature hereto.

JOHN M. EVERTS.